March 21, 1944. C. BRYANT 2,344,493
FILM DEVELOPING HOLDER FOR MOTION PICTURE FILMS
Filed Nov. 5, 1941

INVENTOR
CUNO BRYANT
BY Loyal H. McCarthy
ATTORNEY

Patented Mar. 21, 1944

2,344,493

UNITED STATES PATENT OFFICE 2,344,493

FILM DEVELOPING HOLDER FOR MOTION PICTURE FILMS

Cuno Bryant, Multnomah County, Oreg.

Application November 5, 1941, Serial No. 417,881

1 Claim. (Cl. 242—113)

My present invention relates to an apparatus which may be employed for handling motion picture films during the developing, re-exposing and drying processes. As a motion picture film absorbs moisture during the developing process it stretches or elongates and shortens again during the drying process to approximately its original length. In the developing, re-exposing, fixing and drying process it is highly important that the fragile film should be so handled as to avoid all possibility of unintentional exposure to the light and so as to insure that the various portions of the film become equally subjected to the various developing, washing and fixing solutions, and also to light for re-exposure of the reversal type of film.

It is an object of my invention to provide a circular reel film support upon which a film may be readily mounted and attached in complete darkness, and which is adapted for use in shallow arc-shaped developing trays.

Another object of my invention is to provide a reel type of film support which permits of equal exposure of all the film to the various solutions both within and without the circumference of the reel and to light for re-exposing purposes and also permits normal expansion and contraction of the film during the developing and drying processes without placing any undue strains upon the film.

Referring to the drawing.

Figure 1:
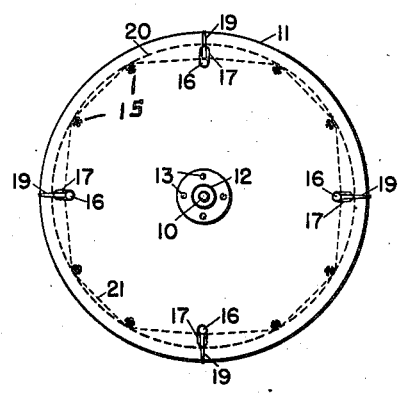
Fig. 1 is a view of one of the end supporting disks of the reel taken on the line 1—1 of Fig. 2, looking in the direction of the arrows.
Figure 2:
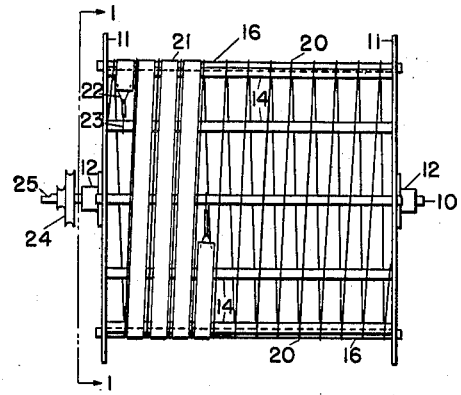
Fig. 2 is a side view of the film supporting reel carrying thereon a short strip of film.
Figure 3:
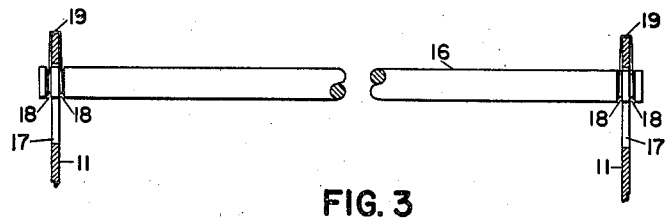
Fig. 3 is a fragmentary view of one of the movable dowels of the reel together with fragmentary portions of end disks of the reel.
Figure 4:
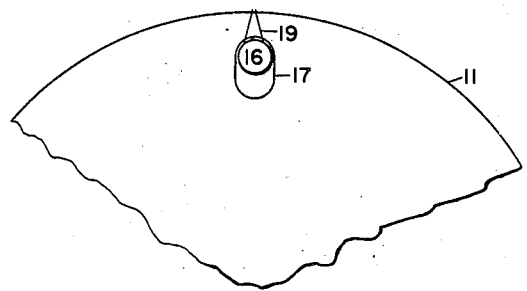
Fig. 4 is another fragmentary view of one of the end disks of the reel which discloses the slot in which the movable dowel moves radially in the disk, and means for applying tension upon said movable dowel.

I realize that various types of drums and reels for supporting films during the developing, fixing, washing and drying processes have heretofore been used, but none of the devices heretofore on the marked provide such simple and efficient means for attaching and winding the film upon the reel and also provide such absolute certainty in subjecting all portions of the film to the various processes during development and without danger of injury to the film.

Like numbers refer to like parts in the various figures.

10 is the shaft of the reel to which the disk ends of the reel 11 are attached to hubs 12, integral with said shaft, by means of the screws 13. The disks 11, as shown in the drawing, carry eight fixed dowels 14 which are held in place between the two disk-like ends of the reel by means of screws 15 as shown in Fig. 1.

The reel shown in the drawing also carries four tension dowels 16 which are movable radially on the disks. These dowels extend through the slotted portion 17 of the disks and have a grooved portion 18, which carries a rubber band 19 or other elastic material which extends from the groove at the inner face of the disk over the outer circumference and loops back into the groove 18 near the outer end of the dowel 16. 20 represents a wire spirally wound around the reel and rigidly fixed at its point of contact with each of the fixed dowels 14 but being unattached to the movable dowels 16. 21 represents a strip of film wound about the reel and properly spaced on the several fixed dowels 14 by means of the wire 20 spirally wound about said reel and rigidly fixed to each dowel 14. Each end of the film strip carries a clip or attaching means 22 provided with a hook 23 suitable for hooking over one of the fixed dowels 14.

The shaft 10 carries a pulley 24 suitable for rotating the reel by being belted to a driving pulley of an electric motor or any other driving pulley. The end of the shaft 10 projects beyond the pulley 24 and has a flattened surface 25 suitable for receiving a crank for rotating the reel by hand.

The wire 21 forms a true circular spiral about the reel so that the arc of the wire 20 from each fixed dowel to the next fixed dowel is the arc of a true circle as shown by the dotted line 20 in Fig. 1. This wire contacts the movable dowels 16 when they are furtherest from the shaft 10, but as these dowels 16 move radially toward the shaft 10 they lose their contact with the wire 20.

When the film 21 is wound upon the reel it is wound sufficiently tight to pull in the movable dowels 16 towards the shaft 10 as shown in Fig. 1. During the developing process, the film expands and the tension means 19 cause the movable dowels 16 to move outwardly towards the circumference of their carrying disks 11 until they contact or approximately contact the wire 20. During the drying process, the shrinking of the film again causes the dowels 16 to move inwardly towards the shaft 10 to the approximate position as shown in Fig. 1.

The wire 20 in no way supports or interferes with the movement of the film on the reel other than keeping it properly spaced thereon, and the film follows the line of a tangent from each dowel to the next dowel, as shown in Fig. 1, rather than the line of the arc of the wire 20. The means for spacing the film on the reel leaves the entire film to its extreme outer edges equally responsive to the developing, fixing and washing solutions as well as to the light during re-exposing processes, and air during the drying processes. The means disclosed eliminate all possibility of uneven dragging or sagging of films such as take place where the film is supported by its edges.

The tangent line formed by the film in passing from one dowel to the next together with the dowels themselves provides just the desired amount of agitation of the chemicals through which the film is passing during the rotation of the reel so as to keep the chemicals at all times thoroughly mixed and insure an equal development of all of the film.

The spacing of the film upon the reel by the spirally mounted wire and the following of tangent lines from one dowel to the next dowel by the film rather than the line of the arc of the spirally mounted spacing wire leaves spaces between the edges of the successive laps of the film upon the reel. These spaces between the edges of the film allow the chemical solutions to readily pass through them and insure the provision of an ample supply of the chemical solution both within and without the circumference of the reel film holder and upon both the back and face of the film.

I claim:

In a rotary reel type of film developing holder, a plurality of rigid film supporting elements, approximately parallel with the axis of said reel, interspersed radially movable, tension controlled film supporting elements, held in place and movable radially of the reel by means of radially positioned slotted bearings, near the circumference of disk like reel ends, and elastic tension means, supported by the periphery of the disk like reel ends and looped about the movable film supports, in combination with a spirally mounted spacing element, adapted to space a film upon the supporting elements of the reel, but not adapted to act as a support of said film.

CUNO BRYANT.